June 3, 1941.  E. SAUER  2,244,023

WAVE-BAND SWITCHING SYSTEM

Filed Feb. 1, 1939

INVENTOR
ERICH SAUER
BY H. S. Snover
ATTORNEY

Patented June 3, 1941

2,244,023

UNITED STATES PATENT OFFICE 2,244,023

WAVE-BAND SWITCHING SYSTEM

Erich Sauer, Berlin, Germany, assignor to Telefunken Gesellschaft für Drahtlose Telegraphie m. b. H., Berlin, Germany, a corporation of Germany Application February 1, 1939, Serial No. 253,952
In Germany February 1, 1938

2 Claims. (Cl. 250—40)

It is known in the art that for changing the wave-band in radio receiver apparatus, an inductance coil or a capacity included in an electric oscillation circuit is replaced by one of a different size or else the entire circuit is substituted. This change in the circuit is accomplished by the agency of mechanical contacts which are alternately opened and closed.

One drawback inhering in circuit arrangements of the said kind is that the contact resistance of the said mechanical contacts is often disproportionately high and that it is subject to irregular fluctuations with the result that crackling and rattling noises or crashes are produced in the set. This applies more particularly to the case where only a part of the circuit is replaced and where as a result the contact or terminal is directly included in the oscillation circuit. The contact resistance of the contacts or terminals will then occasion a marked and more particularly an irregularly fluctuating damping of the oscillation circuit.

According to the present invention for bringing about a change of wave-band, variable condensers are employed rather than mechanical contacts. More particularly, when only part of the circuit is substituted, the impedances to be substituted, each in series with a variable condenser, are connected in parallel to each other in the oscillation circuit, while for switching the wave-band, means are provided by the aid of which at will one of the condensers may be made large and all others negligibly small.

The advantages of the invention are that mechanical contacts are dispensed with in waveband switching; the selectivity is raised, and troublesome noises are avoided.

Figure 1:
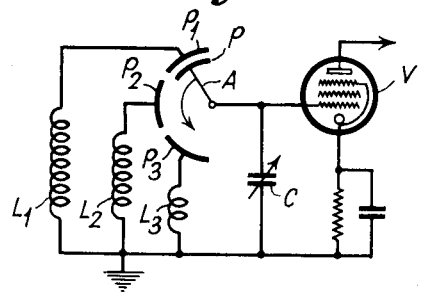
Figure 2:
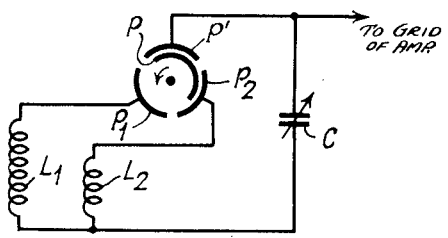
Figure 3:
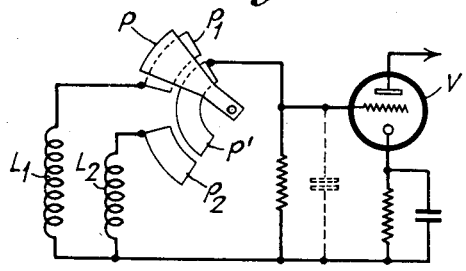
Figure 4:
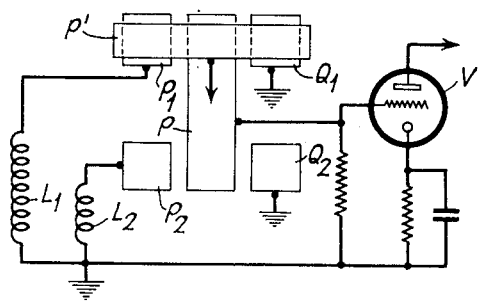
Figure 5:
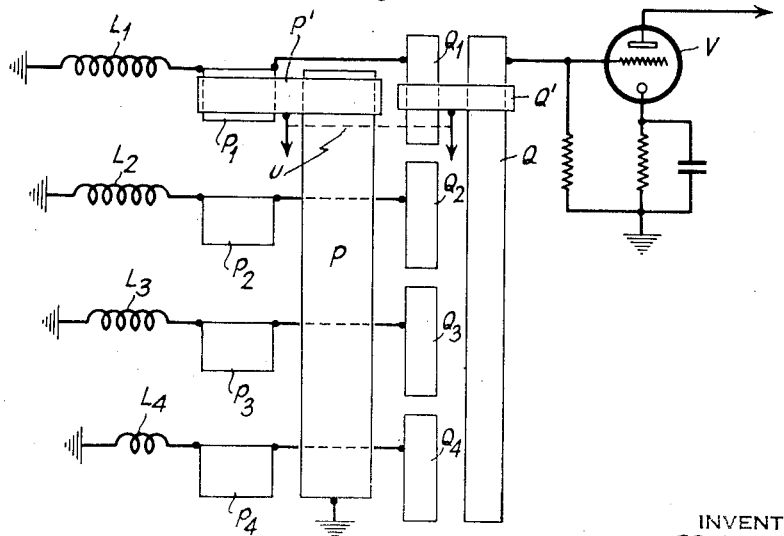

For a clearer understanding of the invention reference will be had to the accompanying drawing, wherein Fig. 1 is an exemplified embodiment of the invention as incorporated in a radio frequency circuit of a short-wave receiver with three wave-bands. Figs. 2 and 3 are modified forms of the invention, and Figs. 4 and 5 are further modifications wherein both the tuning and coupling condensers are simultaneously adjustable.

Referring to Fig. 1, the oscillation circuit consists of the rotary condenser C and one of the three coils L1, L2, and L3. The lower ends or terminals of the said coils L1, L2, L3 are permanently connected with one another, with the stator of the rotary condenser C and with the grounded end of the cathode resistance of the amplifier tube V. The stator of the rotary condenser C is connected with the control grid of the amplifier tube and by way of a rotary wiper A with a cylindrical plate P. By varying the angular position of the latter it may be adjusted to lie opposite to one of the three cylindrical plates P1, P2, P3 which are connected with the free ends of the coils, in such a way that in each case a condenser is formed which completes the oscillatory circuit which includes selectively one of the coils L1, L2, or L3. In the position shown in the drawing, for instance, plate P1 forms a condenser together with plate P, the capacity of which is preferably high in contrast with the maximum capacity of the rotary condenser C. On the contrary, the capacity between the plates P and P2, and between P and P3 is so low that the coils L2 and L3 practically are not included in the oscillation circuit. The movement of the wiper A is produced by the wave-band switch, and this movement is brought about in steps.

The coats P1, P2, P3 may consist of galvanic plating or metallization upon the inner face of a ceramic cylinder, while coat or plate P is brought upon the outer face of a ceramic cylinder journaled co-axially to the hollow cylinder and spaced a small distance apart therefrom. If desired, the inner rotary cylinder could also consist of a hollow cylinder of reduced wall thickness, in which case the coat P is galvanized upon the inside. If a ceramic material possessing a high dielectric constant is used, it is possible to secure a sufficiently high capacity.

However, arrangements of the kind shown in Fig. 1 is apt to involve the shortcoming that the connection to the movable plate P must be established by way of a slip ring or the like. This drawback can be avoided by making the coats connected with the coils as well as with the condenser fixed, while another insulated conductor is selectively approached to one of the coats associated with the coils and simultaneously to the coat associated with the condenser in such a way that there result two condensers in series closing the oscillatory circuit.

An embodiment of this kind is shown in Fig. 2. It will be noted that here a change can be made to only two wave-bands. The arcuate plates P1 and P2 are associated respectively with the free ends of the coils L1 and L2. The plate P' is connected to the rotary condenser C and both in turn are connected with the grid of an amplifier tube not shown. The arcuate plates P1, P2 and P' are arranged about a common axis and form in effect a surface of revolution, said plates being disposed upon the surface of a hollow cylinder (not shown), each of said plates extending for almost one-third or 120° of the cylindrical surface. Inside the hollow cylinder is provided an insulated cylindrical coat P occupying almost one-half of the circumference. In the position of the band switch as shown, the coil L2 is effective since the capacity between plate P2 and P and the capacity between P and P' establish connection of the coil L2 in parallel relation to the condenser C. On actuating the wave-band switch the cylinder supporting the coat P may be turned an angle of 120 degrees with the result that then the coil L1 is cut in the circuit by way of the capacity existing between the plates P1, P, and P'.

The series capacity which closes the oscillation circuit, by movement of the rotor plate, may be used for tuning the oscillation circuit either in conjunction with the other capacities or alone. An arrangement of this kind is shown in Fig. 3. As a fixed shunt capacity there is used here only the grid-filament capacitance indicated by the dash-lines. The flat sector-shaped coats P1, P2, and P' which are connected in the circuit in a way similar to Fig. 2, are brought upon a fixed ceramic disk and in juxtaposition thereto there is mounted a rotary ceramic disk which supports the coat P. In the position as shown, coil L1 serves as the inductance of the oscillation circuit, and the capacity between plates P' and P1 has its maximum value. Upon the steady movement of the plate P in a downward direction the capacity between P1 and P' decreases steadily with the result that the natural frequency of the oscillation circuit is raised inside the wave-band. When the capacity has been reduced practically down to zero (though in reality it is merely cut down to the level of unavoidable stray capacitance), coil L1 is practically cut out of the circuit. As the movement is continued, the capacity between the coats P2 and P' grows steadily with the result that coil L2 becomes cut in the oscillation circuit by way of a gradually growing capacity. An arrangement of this kind is suited especially for ultra-short waves.

It may also be desirable to steadily alter series capacity and shunt capacity simultaneously. Such a scheme is shown in Fig. 4. The movable plate P' co-operates not only with the plate P (associated with the grid) and with the plates P1, P2 (connected with the free ends of the coils) but it co-operates at the same time also with the plates Q1 and Q2 which, like the interconnected coil ends, are grounded thus resulting in a shiftable or sliding condenser. If the insulated plate P' is moved downwards, the series capacity between P1 and P as well as the shunt capacity between Q1 and P are simultaneously reduced from their maximum values down to their minimum values. Upon a further movement, the capacity between P and P2 and at the same time the capacity between Q2 and P are raised from their minimum to their maximum values.

The circuit organization shown in Fig. 4 comprises planar or flat plates, and plate P' is shifted vertically to itself. It will be understood that also a disk-like arrangement as in Fig. 3 or preferably a cylindrical arrangement as in Figs. 1 and 2 are feasible.

It is also possible to change over not only some elements of the circuit such as coils, but to do the same thing with entire oscillation circuits. An exemplified embodiment of this idea is shown in Fig. 5. The non-grounded ends of the four coils L1, L2, L3, L4 are united with the plates P1, P2, P3, P4, and at the same time with the plates Q1, Q2, Q3, Q4. Adjacent to the plates P1—P4 is an elongated grounded plate P, while adjacent to the plates Q1—Q4 is an oblong plate Q which is associated with the grid of the amplifier tube V. A shiftable plate P' results in a variable capacity between the plate P and, at will, one of the plates P1, P2, P3, or P4. These are the capacities of the oscillatory circuits. Another shiftable plate Q' results in a capacity between the plate Q and one of the plates Q1—Q4 chosen at will. These capacities act as coupling capacities, so that through one of these the oscillation circuit closed upon itself may be associated with the grid of the amplifier tube V. The plates P' and Q' are mechanically interconnected (represented by the dotted line U) and they are steadily moved from an upper position downward. With steady movement of the plate Q' the coupling capacity between Q1 and Q remains constant as long as the oscillation-circuit capacity between P1 and P decreases from its maximum to its minimum value whereafter it drops quite suddenly to practically zero. As the movement is continued, also quite suddenly, the coupling capacity between Q2 and Q is raised to its maximum value, while the capacity of the oscillation circuit between P2 and P gradually rises from its minimum value to maximum. In this manner all of the four ranges are covered. Also this arrangement may preferably be made cylindrical as suggested in Figs. 1 and 2.

What I claim is:

1. In an electrical system, an electron discharge tube provided with a plurality of electrodes including a cathode and signal grid, a plurality of resonant circuits each tunable to a different frequency range adapted to be selectively connected between said cathode and grid, said resonant circuits each including a coil the inductance value of which is different from that of the other coils, said coils each having one end connected to the cathode and each of the opposite ends terminating in a flat plate member, the several plate members being coplanar and in vertical alignment, a grounded plate member arranged in substantially the same plane as the terminating plate members and substantially coextensive therewith, a flat plate member movable vertically and in spaced parallel relation to the other mentioned plate members for selectively completing one of the resonant circuits which includes the selected coil and the shunt capacity constituted by the terminating plate member connected to the selected coil, the grounded plate member, and the movable plate member.

2. In an electrical system as defined in claim 1 wherein each of the coil terminating members has connected thereto a second plate member, the several latter members also being coplanar and in vertical alignment, an ungrounded plate member electrically connected to the signal grid and arranged in substantially the same plane as the second plate members and substantially co-extensive therewith, and a second flat plate member movable vertically and in spaced parallel relation to said second plate members and the ungrounded plate member, said two vertically movable members being mechanically coupled together to move in unison.

ERICH SAUER.